(12) United States Patent
Mannen (10) Patent No.: US 12,039,635 B2
(45) Date of Patent: Jul. 16, 2024

(54) INFORMATION PROCESSING APPARATUS, INFORMATION PROCESSING METHOD, AND MEDIUM

(71) Applicant: CANON KABUSHIKI KAISHA, Tokyo (JP)

(72) Inventor: Kento Mannen, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 17/870,644

(22) Filed: Jul. 21, 2022

(65) Prior Publication Data
US 2023/0041298 A1 Feb. 9, 2023

(30) Foreign Application Priority Data
Aug. 3, 2021 (JP) ................. 2021-127732

(51) Int. Cl.
*G06T 11/00* (2006.01)
*G06K 15/02* (2006.01)
*G06K 15/12* (2006.01)
*G06V 10/56* (2022.01)
*H04N 1/60* (2006.01)
*H04N 1/64* (2006.01)

(52) U.S. Cl.
CPC .......... *G06T 11/001* (2013.01); *G06K 15/129* (2013.01); *G06K 15/1807* (2013.01); *G06V 10/56* (2022.01); *H04N 1/60* (2013.01); *H04N 1/644* (2013.01)

(58) Field of Classification Search
CPC ... G06T 11/60; G06T 2200/24; G06T 11/001; G06T 7/11; G06T 2207/10024; G06T 11/00; G06T 7/90; G06V 10/56; G06F 3/1208; G06F 3/0482; G06F 3/04845; G06F 3/1256; G06F 3/04842; G06F 3/04847; H04N 1/60; H04N 1/644
See application file for complete search history.

(56) References Cited

U.S. PATENT DOCUMENTS

| | | | |
|---|---|---|---|
| 2011/0043835 A1* | 2/2011 | Nishide | H04N 1/54 358/1.9 |
| 2013/0050238 A1* | 2/2013 | Bergou | G06F 18/23 345/589 |
| 2022/0180116 A1* | 6/2022 | Dodeja | G06T 11/001 |

FOREIGN PATENT DOCUMENTS

JP 2013-161196 8/2013

* cited by examiner

*Primary Examiner* — Xiao M Wu
*Assistant Examiner* — Scott E Sonners
(74) *Attorney, Agent, or Firm* — Venable LLP (57) ABSTRACT

An information processing apparatus extracts colors used for an image, links each color to one of color groups including a first color group and a second color group, displays, in a first region of a UI, a representative color associated with a group, of the color groups, to which extracted color is linked, displays a color palette including one color in a second region of the UI, and replaces a color included in the image and belonging to the color group associated with the selected representative color with a color selected from the color palette. If the color groups include groups to which at least one extracted color is linked, representative colors respectively associated with the groups to which at least one of the extracted colors is linked are displayed in the first region.

19 Claims, 10 Drawing Sheets

| COLOR VALUE 1 | GROUPED FLAG 1 |
|---|---|
| COLOR VALUE 2 | GROUPED FLAG 2 |
| : | : |
| COLOR VALUE n | GROUPED FLAG n |

FIG. 7B 710

| GROUP IDENTIFICATION INFORMATION 1 | GROUP IDENTIFICATION INFORMATION 2 | ... |
|---|---|---|
| REPRESENTATIVE COLOR 1 | REPRESENTATIVE COLOR 2 | ... |
| COLOR 1-1 | COLOR 2-1 | ... |
| COLOR 1-2 | COLOR 2-2 | ... |
|  | COLOR 2-3 |  |

FIG. 8A

| | | 800 |
|---|---|---|
| COLOR VALUE 1 | NO SPECIAL COLOR | GROUPED FLAG 1 |
| COLOR VALUE 2 | SPECIAL COLOR 1 | GROUPED FLAG 2 |
| : | : | : |
| COLOR VALUE n | NO SPECIAL COLOR | GROUPED FLAG n |

| GROUP IDENTIFICATION INFORMATION 1 | GROUP IDENTIFICATION INFORMATION 2 | ... |
|---|---|---|
| REPRESENTATIVE COLOR 1 | REPRESENTATIVE COLOR 2 | ... |
| NO SPECIAL COLOR | SPECIAL COLOR 1 | ... |
| COLOR 1-1 | COLOR 2-1 | ... |
| COLOR 1-2 | COLOR 2-2 | |
| | COLOR 2-3 | |

INFORMATION PROCESSING APPARATUS, INFORMATION PROCESSING METHOD, AND MEDIUM

BACKGROUND OF THE INVENTION

Field of the Invention

The present invention relates to an information processing apparatus, an information processing method, and a medium.

Description of the Related Art

Images are roughly classified into two types, namely, raster images and vector images. A raster image has an image form composed of pixels having RGB values arranged vertically and horizontally in a lattice pattern and uses an extension such as "bmp", "gif", or "jpg." In contrast, a vector image has an image form composed of a set of graphical elements and uses an extension such as "svg" or "eps." A vector image is composed of graphical elements, and hence a computer can identify elements constituting the image by seeing the image data. Assume that an image depicting one circle is a raster image. In this case, the computer cannot identify the circle as a circle unless special image processing is performed. In contrast to this, when an image depicting one circle is a vector image, the computer can clearly identify the circle as a circle and can also identify colors constituting the circle and the color of the edge of the circle. Each element constituting a vector image is called an object. Each object can be identified.

In addition, a vector image is composed of objects, and hence has a merit of not deteriorating in image quality even upon enlargement or reduction. This has recently been increasing the occasion of using vector images as images on the Web and print data. An increase in the use of vector images has increased the number of graphics design applications using a vector image as one element of graphics.

Some graphics design applications using a vector image as one element of graphics have a function of simply editing a captured vector image. This simplified editing function often includes a function of changing the colors of the objects of a vector image.

The graphics design application provides a user interface (UI) for displaying only the color used for a selected object as a general color changing UI for simply changing the colors of the objects of a vector image. Another general color changing UI is a UI for extracting the colors of all the objects and listing the extracted colors. Using the UI for listing extracted colors makes it possible to designate a color change for each color. When, for example, the user performs an operation of changing yellow to red on the UI, the UI can perform editing to change all the yellow objects in a vector image into red objects. This method cannot perform a color change for each object, and hence reduces the degree of freedom in vector image editing. On the other hand, the method can simultaneously change the same color of objects, and hence allows an intuitive color change.

However, in extracting the colors used for objects and simply listing the extracted colors, the application handles even colors slightly different in RGB value from each other as different colors. In general, it is difficult for the human eye to discriminate the difference between colors slightly different in RGB value from each other. For example, the application handles a color with RGB value (255, 0, 0) and a color with RGB value (255, 0, 1) as different colors because of the different RGB values. However, it is difficult for the human eye to discriminate these colors, and the user cannot determine which colors correspond to which object colors. Accordingly, the user cannot intuitively perform a color change.

Japanese Patent Laid-Open No. 2013-161196 proposes a method of calculating a cluster width in accordance with data groups when clustering the data groups. In general, however, a vector image includes only several tens of colors at most. Accordingly, this method requires complicated processing and a long processing time when applied to clustering of several tens of colors, and hence is not suitable for simplified editing of vector images.

SUMMARY OF THE INVENTION

The present invention provides a user interface for simply editing the colors of objects included in a vector image in a graphics design application.

An information processing apparatus according to the present invention has the following configuration. That is, according to one aspect of the present invention, an information processing apparatus comprising: at least one memory configured to store at least one program; and at least one processor, the at least one program causing the at least one processor to perform extracting a plurality of colors used for an image, linking each of the plurality of extracted colors to one of a plurality of color groups including a first color group associated with a first representative color and a second color group associated with a second representative color, displaying, in a first region of a user interface, a representative color associated with a group, of the plurality of color groups, to which at least one of the plurality of extracted colors is linked, displaying a color palette including at least one color in a second region of the user interface, and replacing a color included in the image and belonging to the color group associated with the selected representative color with a color selected from the color palette, wherein if the plurality of color groups include a plurality of groups to which at least one of the plurality of extracted colors is linked, a plurality of representative colors respectively associated with the plurality of groups to which at least one of the plurality of extracted colors is linked are displayed in the first region is provided.

The present invention can provide a user interface for simply editing the colors of objects included in a vector image in a graphics design application.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Information Processing Apparatus

Figure 1:
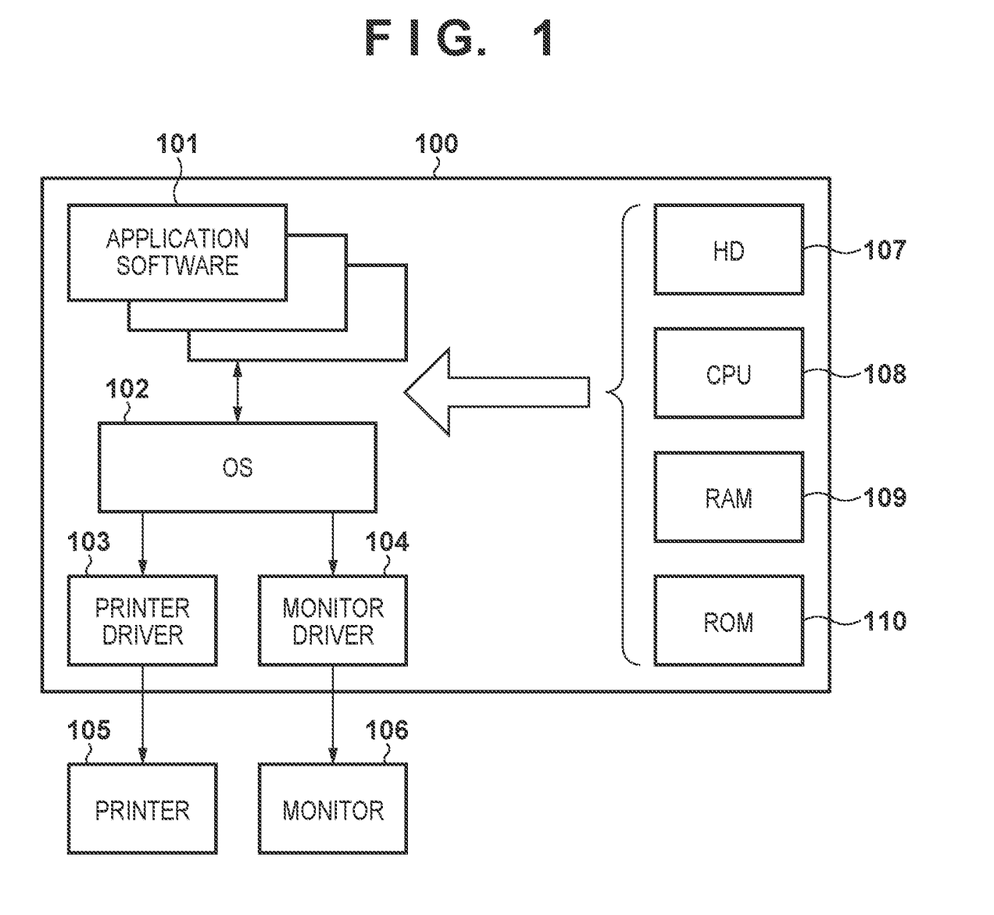
FIG. 1 is a block diagram showing the schematic arrangement of an information processing apparatus system.

FIG. 1 is a block diagram showing the arrangement of a host computer as an example of an image processing apparatus. A printer 105 and a monitor 106 are connected to a host computer 100. The host computer 100 has application software 101 such as a word processor, a spreadsheet, and an Internet browser. Various types of drawing processing instructions (an image drawing instruction, a text drawing instruction, and a graphics drawing instruction) each indicating an output image issued by the application software 101 are input to a monitor driver 104 via an operating system (OS) 102.

When printing is performed, these drawing instructions are also input to the object 103 via the OS 102. A printer driver 103 is software for creating print data by processing the drawing instructions and making the printer 105 print the data. The monitor driver 104 is software for processing the drawing instructions and making the monitor 106 display an image.

The host computer 100 includes, as hardware, a CPU 108, a hard disk (HD) 107, a RAM 109, and a ROM 110 to store the above software and make it function. Conceivable is a form in which arbitrary application software having a print function is installed in the host computer 100, and the monitor 106 and the printer 105 are connected to the host computer 100.

The application software 101 creates output image data by using text data classified as a text such as characters, graphics data classified as graphics such as graphic figures, and image data classified as photographic images and the like. The application software 101 may use any one of these types of data. The output image data is then displayed as an image on the monitor 106. When printing an image based on output image data, the application software 101 issues a print output request to the OS 102. The application software 101 then issues a drawing instruction group composed of a text data portion formed from the text drawing instruction, a graphics data portion formed from the graphics drawing instruction, and an image data portion formed from the image drawing instruction to the OS 102.

Graphics Design Application

Figure 2:
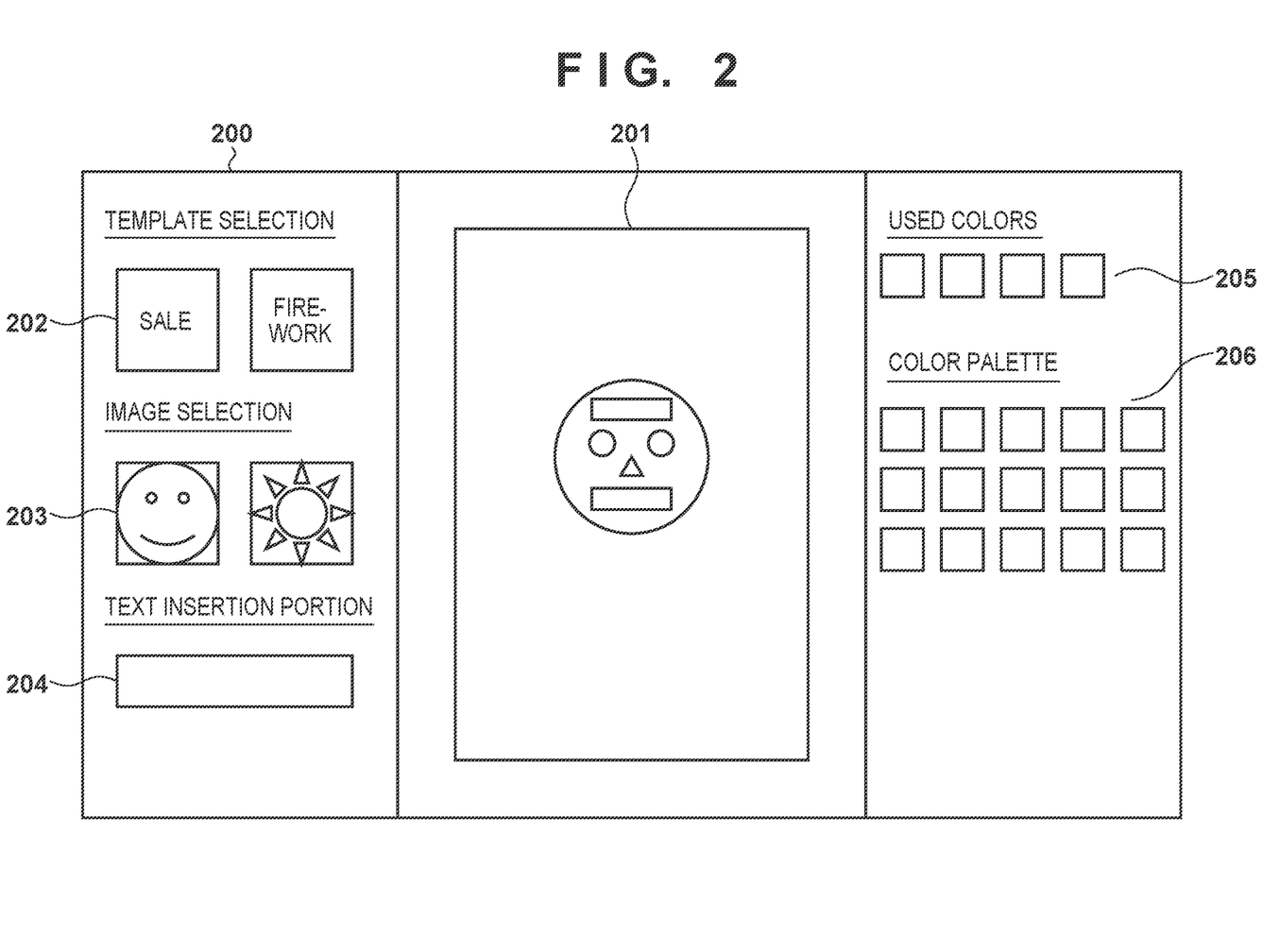
FIG. 2 is a view showing the screen structure of a graphics design application.

FIG. 2 is a view showing an example of the screen structure of a user interface (UI) based on a graphics design application 200 having a function of arranging a vector image as one element of graphics and simply editing the colors of objects included in the vector image.

The graphics design application 200 displays a UI screen including a preview editing region 201, a template selection region 202, an image selection region 203, a text insertion portion 204, a current color selection region 205, and a color palette region 206.

The template selection region 202 displays graphics held as templates by an application. The operator can select any one of the templates. The graphics design application 200 displays the selected graphics in the preview editing region 201.

The image selection region 203 displays the images held by an application. The operator can select any one of the images. The graphics design application 200 displays the selected image in the preview editing region 201.

The text insertion portion 204 receives a text input. When a text is inserted in the text insertion portion 204, the graphics design application 200 displays the text in the preview editing region 201.

The current color selection region 205 displays a list of the colors of the objects of a vector image. The operator can select any one of the colors displayed in the current color selection region 205. The operator may select a plurality of colors.

The color palette region 206 displays a list of the colors that can be used for color changes of objects. When the operator selects a color in the color palette region 206, the graphics design application 200 replaces the color selected in the current color selection region 205 with the color selected in the color palette region 206. In addition, in the vector image, the color of an object which is the same as the color selected in the current color selection region 205 is replaced with the color selected in the color palette region 206.

First Embodiment

Figure 3:
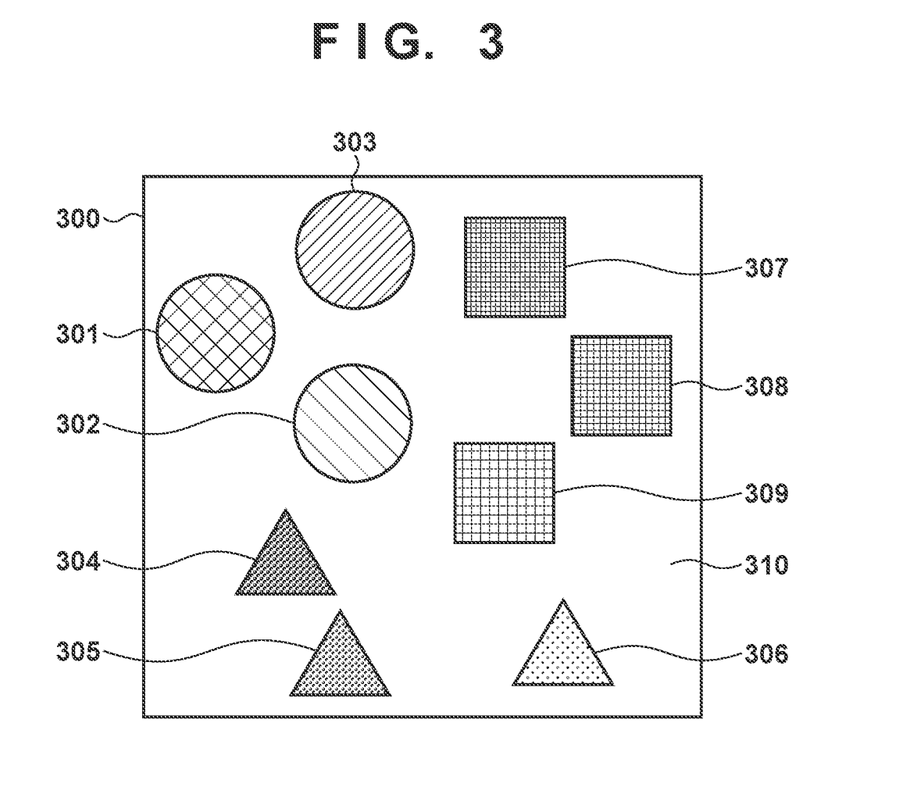
FIG. 3 is a view showing an example of a vector image.

FIG. 3 is a view showing an example of a vector image using colors slightly different in RGB value from each other. Referring to FIG. 3, different patterns exhibit different colors. In this case, colors slightly different in RGB value from each other indicate, for example, colors which are slightly different in RGB value from each other but whose differences cannot be visually recognized by the human eye, like a color with RGB value (255, 0, 0) and a color with RGB value (255, 0, 3). That is, colors slightly different in RGB value from each other can be colors whose distances in the RGB space are small. In this case, it may be determined that the distances are small when being smaller than a predetermined threshold or falling within the threshold. A vector image 300 includes objects 301 to 310. The objects 301 to 303 have colors slightly different in RGB value from each other and so do the objects 304 to 306 and the objects 307 to 309.

Figure 4:
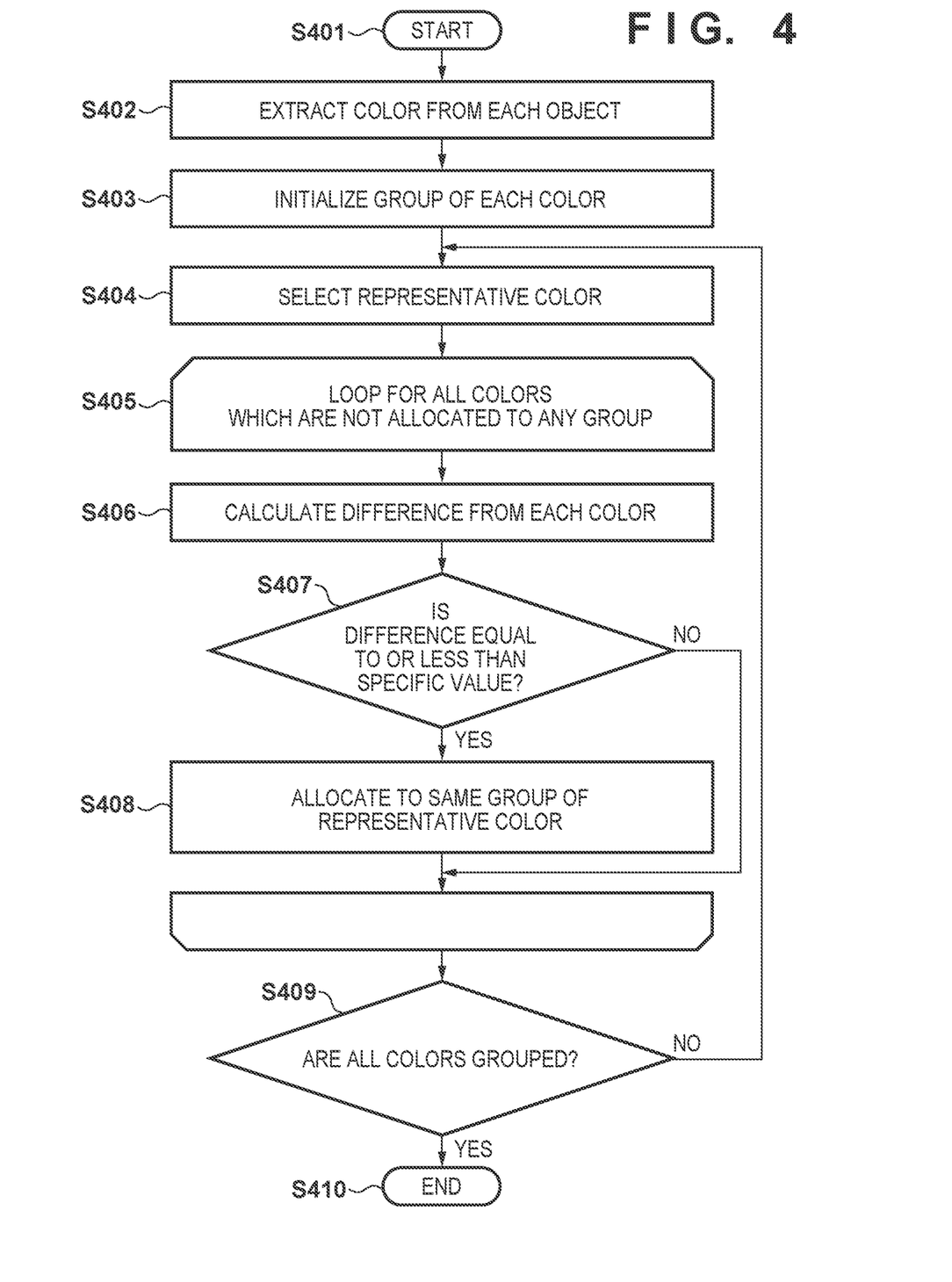
FIG. 4 is a flowchart for grouping the colors of the objects of the vector image.

FIG. 4 is a flowchart of a process for grouping the colors used for the objects of a vector image. On the software, the application software 101 executes the process. On the hardware, the CPU 108 executes the process. Therefore, in the explanation of the flowchart, the "application software 101" that performs respective steps of the flowchart can be replaced with the "CPU 108." In addition, the processing in FIG. 4 may be started in response to a case in which a template or image is selected in the user interface in FIG. 2. Note that a selected image is a vector image. Executing the processing in FIG. 4 will create color group information by associating the identification information of groups, the colors (or their identification information) belonging to the groups, and the representative colors (or their identification information) of the groups with each other. The color group information is saved in, for example, the HD 107.

Figure 7A:
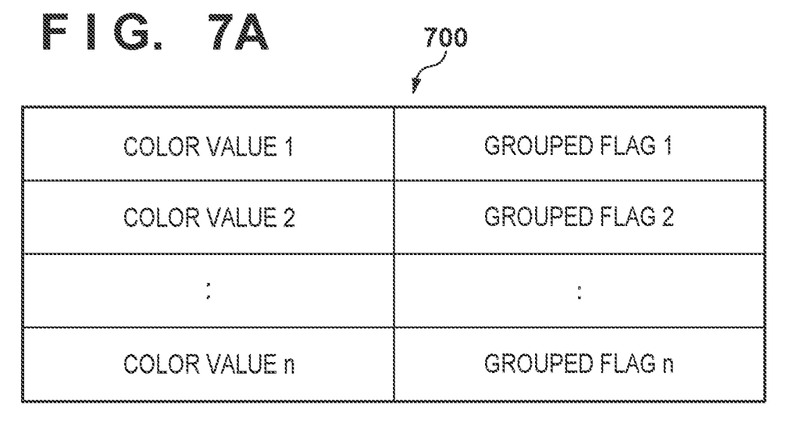
FIGS. 7A and 7B are views showing an example of a data structure for grouping colors according to the first embodiment.

In step S402, the application software 101 extracts colors from all the objects of the selected vector image. If the image includes a plurality of colors, the application software 101 extracts the plurality of colors. The extracted colors are saved, for example, in the form of a list. This used color list may be, for example, a list of color values representing the colors or a table (information) associating color values with the identification information of objects having the color values. In addition, the used color list includes the fields of flags (information) that are associated with the respective colors to indicate that the colors have already been grouped. Note that objects having a given color can differ in number from objects having a different color. Accordingly, when the identification information of each object is included in the list, the used color list may not directly include the identification information but may be structured to refer to the information via reference information. FIG. 7A shows an example of a used color list 700 including a color value and a grouped flag as one record. A used color list can be created by, for example, sequentially referring to the colors of the objects included in selected image data from the list of the objects and adding each color not included in the used color list to the used color list. The used color list may be empty in its initial state.

In step S403, the application software 101 initializes the groups classified according to the respective colors extracted in step S402. When performing initialization processing, the application software 101 may, for example, create the identification information of the first group in advance. Similar processing may be performed for a plurality of groups. However, since the number of groups is unknown until the end of classification, only a group of interest may be initialized.

In step S404, the application software 101 selects a representative color from the colors that are not allocated to any groups. In addition, the application software 101 registers the representative color as the first member of the group and sets a grouped flag for the color in the used color list. In this case, the application software 101 may select one representative color. The application software 101 may select, for example, as a representative color, the head color of the colors registered in the used color list. Obviously, the application software 101 may select another suitable color as a representative color.

In step S405, the process enters loop processing of performing steps S406 to S408 with respect to all the colors which are not allocated to any group. In step S406, the application software 101 calculates the RGB difference between the representative color selected in step S404 and each color which is not allocated to any group. In this calculation, the application software 101 may calculate, for example, the difference between a color (color of interest) of the colors registered in the used color list to which attention is paid and a representative color (representative color of interest) to which attention is paid. In this case, all the colors which are not allocated to any group are colors, of the colors registered in the used color list for which no grouped flag is set.

In addition, a calculated difference may be, for example, the distance (that is, the color difference) in the RGB space. In this case, a color difference is the square-root of sum of squares of a difference for each color component. In this procedure, since the application software 101 evaluates the degree of color difference instead of evaluating the color different itself, the sum of squares of a difference for each color component may be used as an index value.

In step S407, the application software 101 determines whether the RGB value difference calculated in step S406 is equal to or less than a specific value (also called a predetermined value or threshold). Upon determining in step S407 that the RGB value difference is equal to or less than the specific value, the application software 101 allocates each color to a group of the same representative color in step S408. That is, a color of interest is associated with a current group of interest. For this purpose, for example, the identification information or color value of a color of interest is registered in association with a group of interest. Upon completing the determination associated with the color of interest, the application software 101 sets the color as a color that has been grouped, and repeats the processing from step S406 for a next color as a color of interest. The specific value may be a fixed value such as ±5 or a value selected by the user with a selection means provided separately. In this case, a fixed value of ±5 is used.

Upon going through the loop processing in step S405 with respect to the representative colors, the application software 101 performs the processing in step S409 to determine whether all the colors have been grouped. This determination may be, for example, determination whether there is any color that has not been grouped (that is, a color which is not allocated to any group) after the above processing for the current color of interest in the used color list. Upon finding a color which is not allocated to any group as a result of determination in step S409, the application software 101 returns to the processing in step S404 to associate the color as a new representative color of interest with a new group. The application software 101 repeats the processing in and after step S405. If all the colors are grouped, the application software 101 terminates the processing.

Figure 7B:
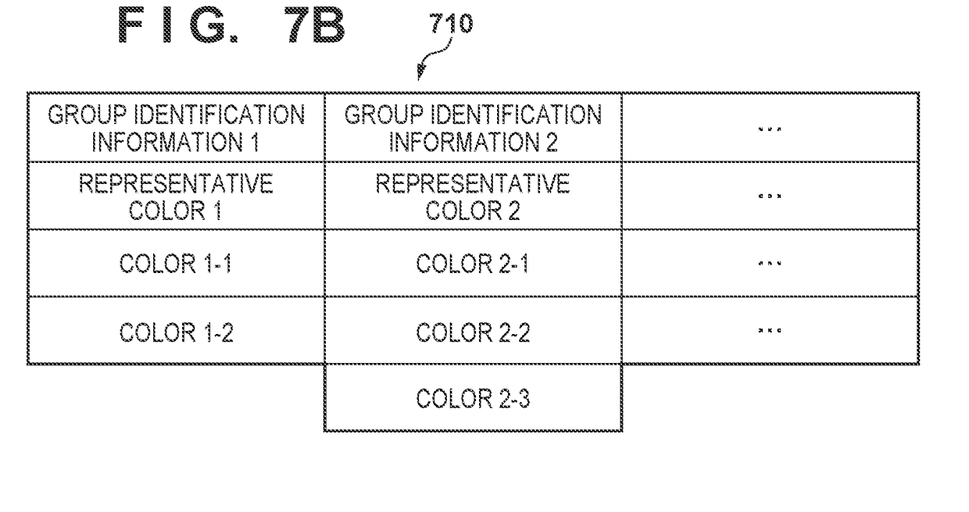

The application software 101 groups the colors used for the vector image selected in the above manner and displays the representative color of each group in the current color selection region 205 of the graphics design application 200 shown in FIG. 1. FIG. 7B shows an example of a color group table (or color group information) 710 created in the above procedure. One record is composed of the identification information of each group, the color information of a representative color, and the color information of each member. A color value or identification information provided separately may be used as color information. Note that the record length corresponding to each group changes depending on the number of colors belonging to the group, as shown in FIG. 7B, and hence each record may be provided with a field indicating the length or a pointer or the like may be used to cope with variable lengths.

Assume that in this case, only representative colors are displayed in the current color selection region 205. Note that the HD 107 stores the color group information 710 associating the identification information of each group with colors (or their identification information) belonging to each group and each representative color (or its identification information). This makes it possible, when the representative color of a group is specified, to specify each color belonging to the group. Accordingly, each color belonging to a group represented by a representative color may be displayed on the UI in addition to the representative color. In this case, the application software 101 may display, for example, a representative color, and may then display a frame indicating the group and each color belonging to the group in the frame.

Note that the above grouping processing can be considered as the processing of associating each of a plurality of extracted colors with a corresponding one of color groups associated with a representative color. For example, grouping processing can be considered as the processing of associating each extracted color with one of a plurality of color groups including the first color group associated with the first representative color and the second group associated with the second representative color.

Figure 5:
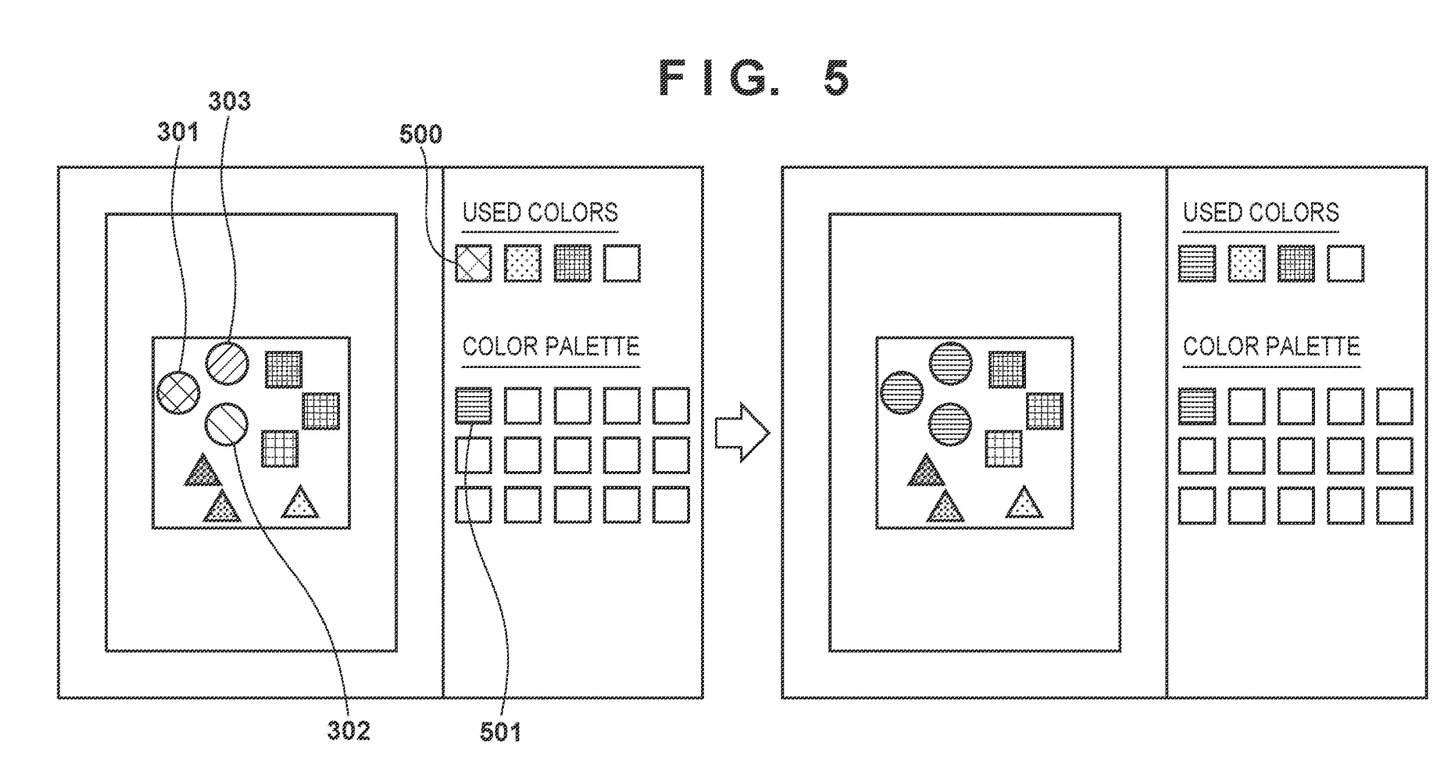
FIG. 5 is a schematic view for a method of simply editing the colors of objects included in a vector image in a graphics design application.

FIG. 5 shows an example of a method of performing color conversion for the vector image 300. As a result of performing the processing of the flowchart shown in FIG. 4 with respect to the vector image 300, the colors of the objects 301 to 303 are allocated to the group represented by a representative color 500 displayed in the current color selection region 205. Consider in this state that a color 501 is selected from the color palette region 206 after the color 500 in the current color selection region 205 is selected. In this case, each color belonging to the group represented by the color 500 is replaced with the color 501 selected from the color palette region 206. As a result, the colors of the objects 301 to 303 of the image displayed in the preview editing region 201 are also replaced with the color 501.

For this purpose, when, for example, a given color is selected from the colors displayed in the current color selection region 205, the application software 101 searches the color group information for colors belonging to the group represented by the selected color as a representative color. The application software 101 searches the image displayed in the preview editing region 201 for objects of the found corresponding color and replaces the colors of the objects with the color selected from the color palette region 206. This processing is executed with respect to all the colors of the group to which the selected representative color belongs. This replaces all the colors of the group of the selected representative color with the selected color.

Figure 9:
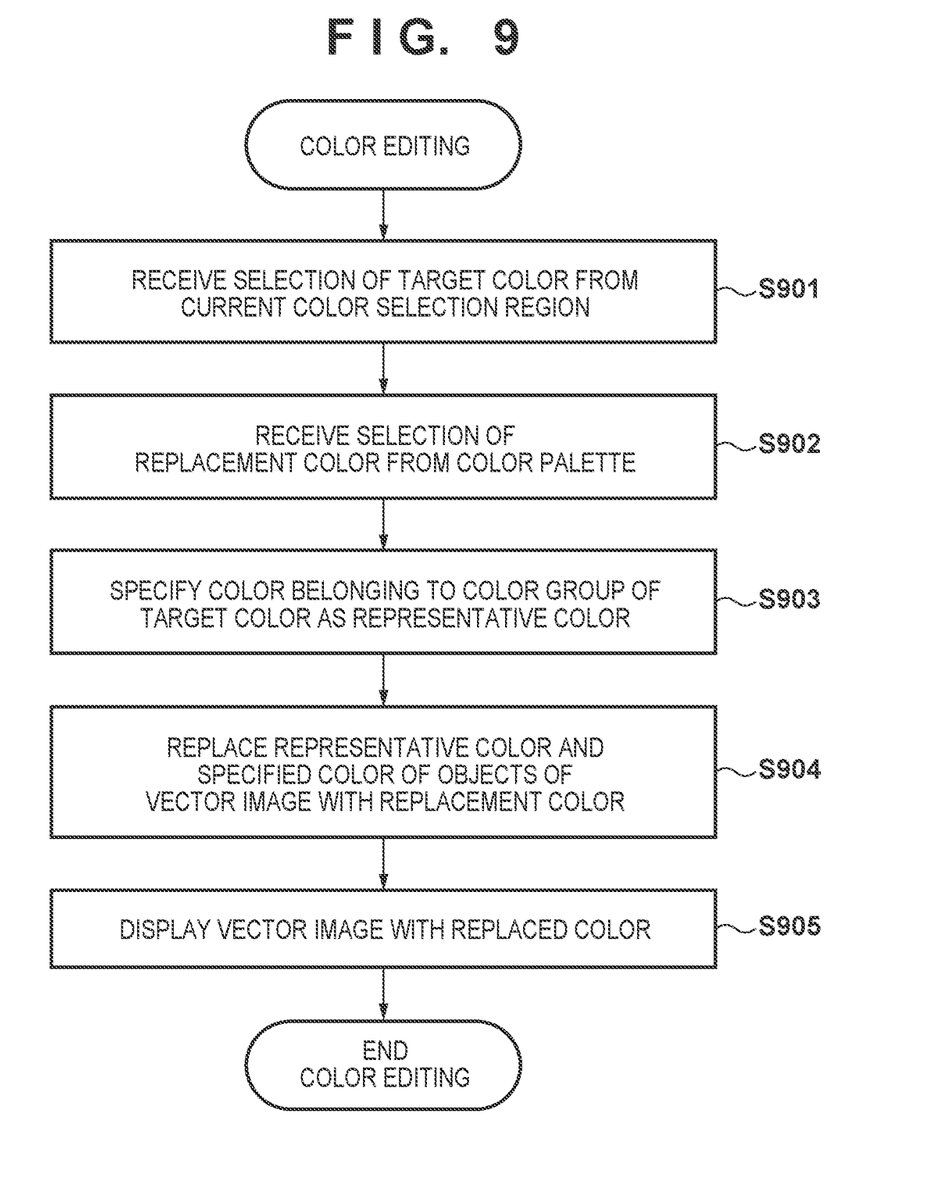
FIG. 9 is a flowchart of a procedure for replacing the color selected from the representative colors of a vector image with a designated color and re-displaying the image.

FIG. 9 shows a procedure for color editing processing. In this procedure, for example, the application software 101 executes the processing on the software. On the hardware, the CPU 108 executes the processing. Therefore, the "application software 101" can be replaced with the "CPU 108" in the following explanation. The application software 101 receives the selection of a color from the current color selection region 205 of the user interface screen in FIG. 2 by the operator (step S901). In this case, the selected color is called the target color. The application software 101 receives the selection of a color from the color palette (step S902). In this case, the selected color is called the replacement color. The execution order of steps S901 and S902 may be reversed. Subsequently, the processing in and after step S903 is executed in accordance with an instruction to start color replacement. An instruction to start replacement may be issued as, for example, a button provided on the user interface is touched or both a target color and a replacement color are selected.

When an instruction to start replacement is issued, the application software 101 sequentially searches the representative colors of the color group table for the target color and specifies the corresponding group (that is, the group of the target color as the representative color) and colors belonging to the group (step S903). The application software 101 sequentially searches for objects of the vector image with the color specified in step S903 and replaces each corresponding color with the replacement color (step S904). The application software 101 re-displays the vector image obtained by replacing the target color with the replacement color in this manner on the user interface screen.

As described above, according to this embodiment, similar colors whose difference is difficult to discriminate by the user are displayed in their representative color. In addition, selecting a representative color can select colors similar to the representative color. This allows the graphics design application to display a UI easy to operate for simple editing of the colors of objects included in a vector image.

Second Embodiment

In the background of this embodiment, there are settings for special colors other than usual colors represented by only RGB values. Assume that a printer 105 is a printing apparatus that can print by using special types of ink. A special ink is ink that develops a special color (to be also referred to as a "spot color" hereinafter) and is, for example, ink with which a color developed at the time of printing cannot be displayed in the sRGB space. That is, a printing apparatus as peripheral equipment 32 is configured to be capable of spot color printing that is printing using spot color inks other than usual inks (that is, special inks to be also referred to as "spot color inks" hereinafter).

"Usual inks" are inks for printing of process colors and are inks of colors such as cyan (C), magenta (M), yellow (Y), and black (K) serving as bases of the process colors. Note that a process color is one color of C, M, Y, and K or a color expressed by a combination of two or more colors of C, M, Y, and K. In addition, in this embodiment, fluorescent pink and fluorescent orange are used as spot color inks. A spot color is a color different from the process colors and is a color that cannot be expressed by only one color of C, M, Y, and K or a combination of two or more colors of C, M, Y, and K. However, the present invention is not limited to this form. The number and colors of spot color inks may be arbitrarily set, and inks of colors other than fluorescent colors may be used. For example, as spot color inks, a violet ink, a green ink, an orange ink, a gold ink, a silver ink, and the like may be used. In addition, inks of other metallic colors may be used. Furthermore, inks obtained by blending special inks and other inks (for example, usual inks) may be handled as special inks.

Assume that special colors are set to make the printer print using special inks or textures are set instead of colors. In this case, unless these special color settings can be handled independently of usual colors, color conversion undesired by the user may be performed. Accordingly, this embodiment will exemplify processing in consideration of special color settings.

Figure 6A:
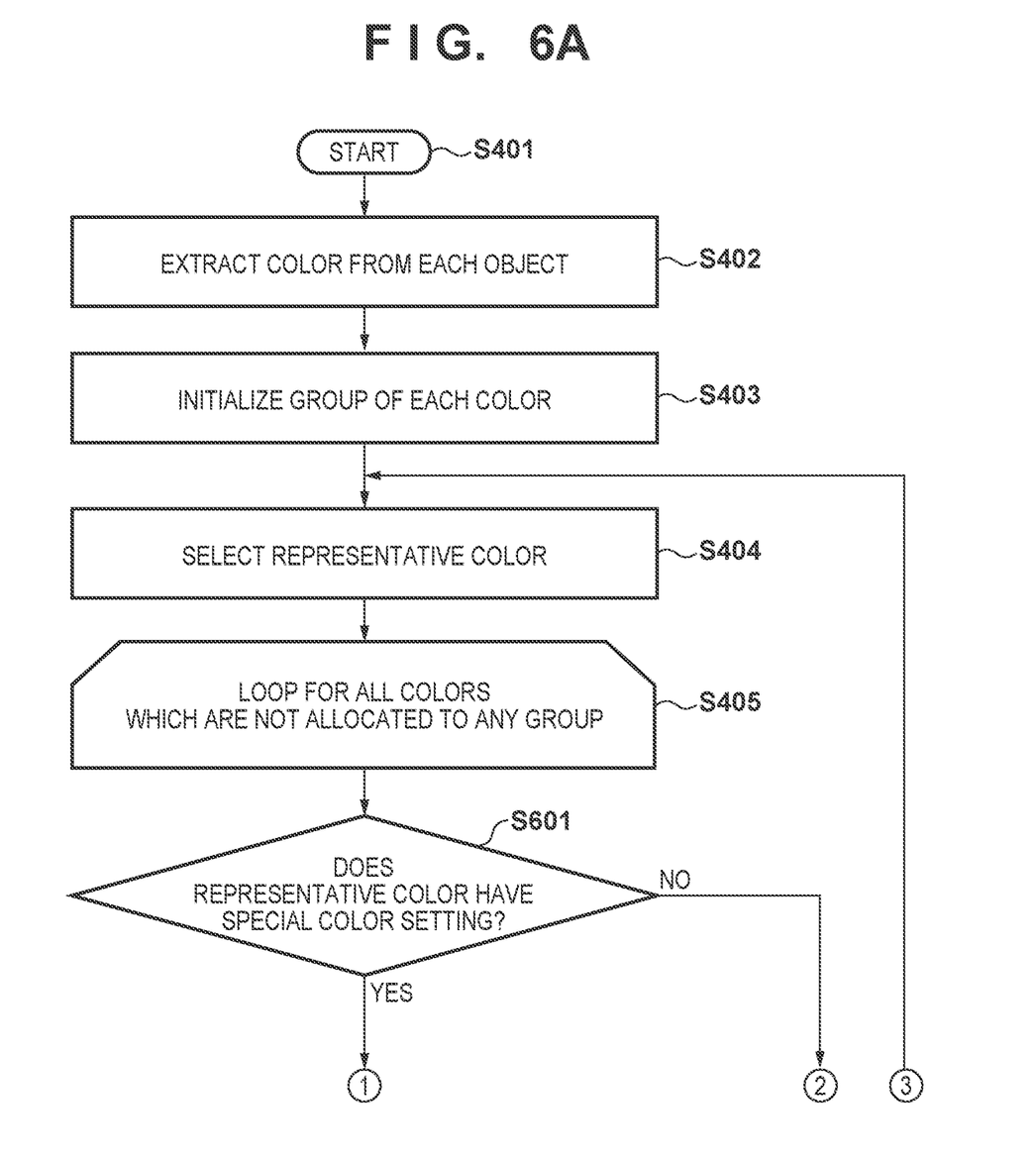
FIG. 6A and FIG. 6B are flowcharts for grouping the colors of the objects of a vector image in consideration of special color settings.
Figure 6B:
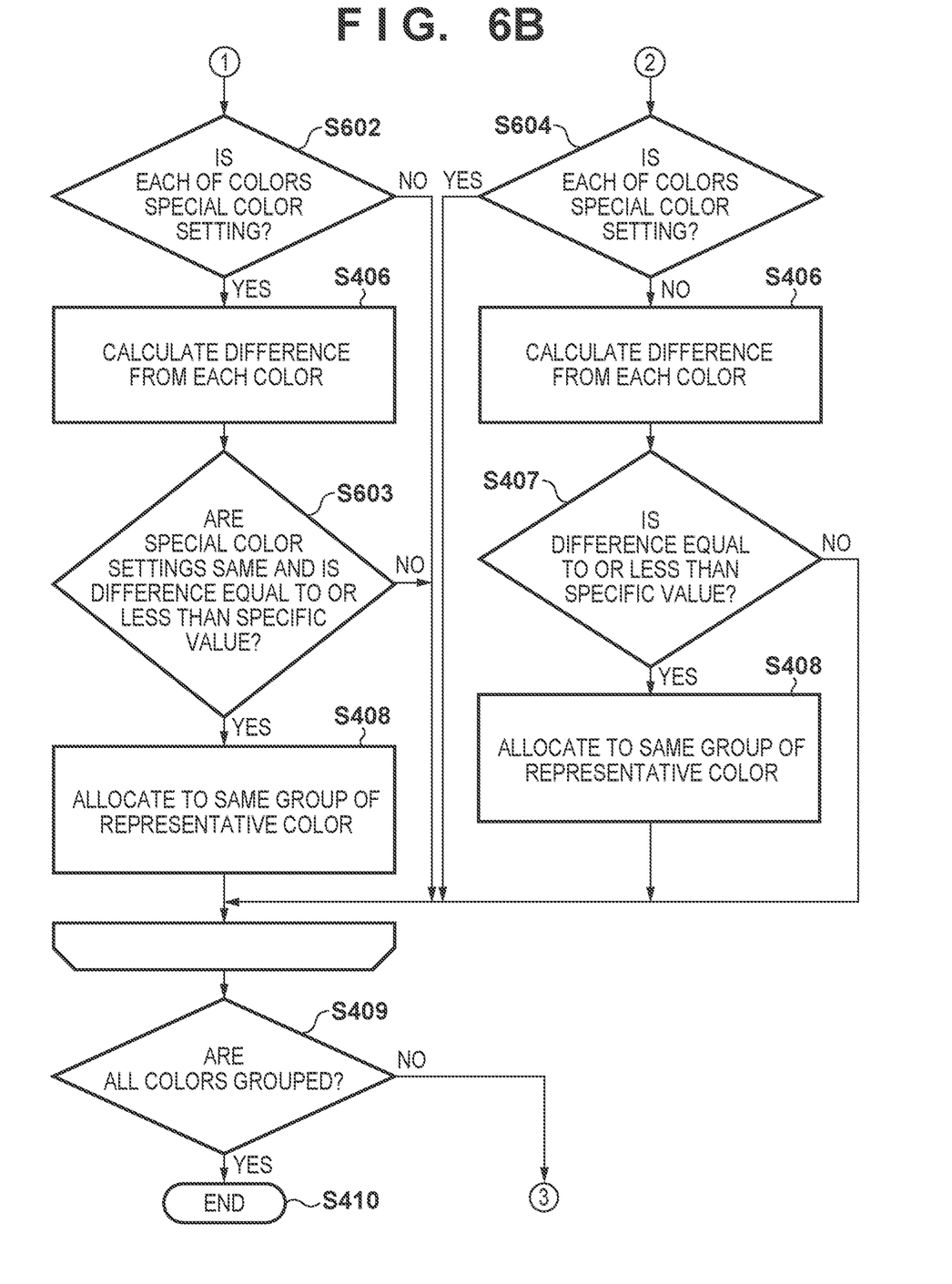

FIG. 6A and FIG. 6B are flowcharts obtained by changing the processing in the loop of step S405 in the flowchart shown in FIG. 4. Accordingly, the subject that executes the processing is the same as in FIG. 4, and the trigger of execution is also the same as in FIG. 4. In addition, processes outside the loop from step S405 are common to those in FIG. 4, and some processes inside the loop are common to those in FIG. 4. Accordingly, a description of these processes will be omitted.

Figure 8A:
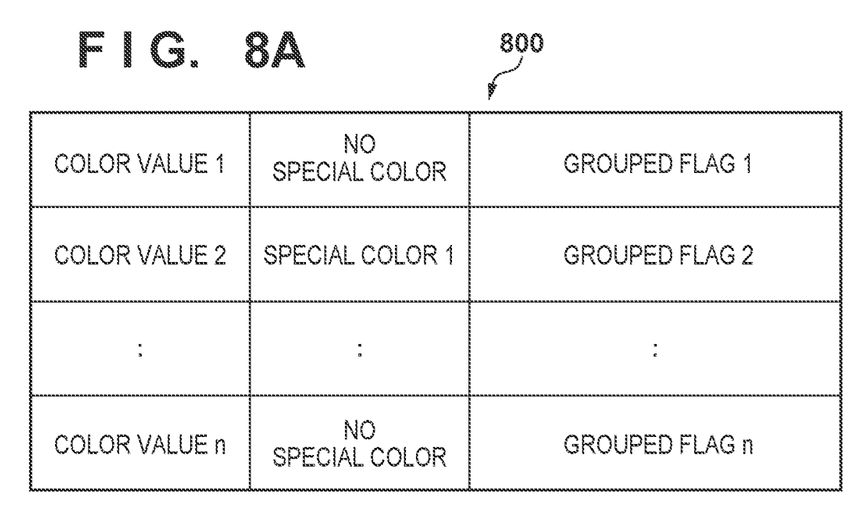
FIGS. 8A and 8B are views showing an example of a data structure for grouping colors according to the second embodiment.

In this embodiment, an object printed in a special color is associated with information (to be referred to as special color information) indicating that the color is a special color. A pixel to which special color information is added is printed in a special color corresponding to the RGB value of the pixel. Note that the RGB value of a pixel corresponding to a special color can also be used as the RGB value of a pixel corresponding to the color expressed by only a usual ink. In other words, the same RGB value as the RGB value of a pixel corresponding to a special color can also be set for a pixel corresponding to the color expressed by only a usual ink. In this case, whether to use a special ink for printing the pixel having the RGB value is controlled based on whether special color information is added to the pixel. Accordingly, in step S402, the application software 101 refers to special color information at the time of creating a used color list and registers, with respect to an object to which special color information is added, the special color information in association with the color information of the object. In the used color list according to this embodiment, therefore, colors that have the same RGB component but are discriminated based on the presence/absence of special color information are registered as different colors. FIG. 8A shows an example of a used color list 800. As shown in FIG. 8A, this list includes special color information addition to color values. Information indicating not being a special color is added to a color that is not a special color, and special color information indicating what kind of special color is added to a special color.

Figure 8B:
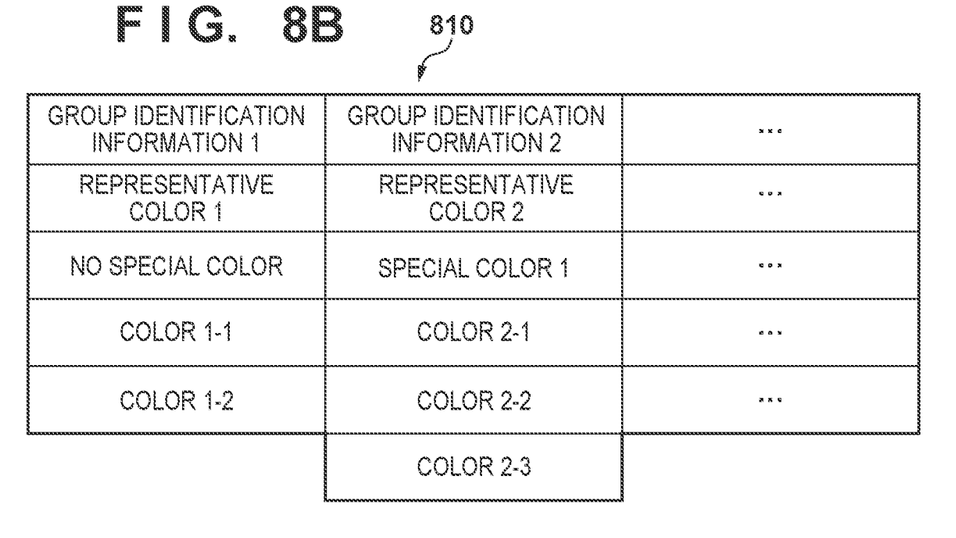

Upon entering the loop processing in step S405 through steps S402 to S404, the application software 101 determines in step S601 whether the representative color of interest has a special color setting. If special color information is set, the application software 101 determines that the representative color has a special color setting. Note that when a new color group is created and its representative color is registered in the color group table, special color information is also registered in association with the representative color. FIG. 8B shows an example of such a table.

Upon determining in step S601 that the representative color has a special color setting, the application software 101 determines in step S602 whether a color of interest as a comparison target has a special color setting. Upon determining in step S602 that the color of interest has a special color setting, the application software 101 performs the processing in step S406 to calculate a color difference in the RGB space. In step S603, the application software 101 determines whether the representative color has the same special color setting as that of the color of interest and the RGB value difference obtained in step S406 is equal to or less than a specific value. Special color information includes many types of information such as information indicating a transparent toner representing a transparent color and a metallic color. In step S603, the application software 101 determines whether the types of information match each other, that is, the colors match in special color type. Upon determining in step S603 that the representative color of interest has the same special color setting as that of the color of interest and the RGB value difference is equal to or less than the specific value, the application software 101 allocates the color of interest and the representative color of interest to the same group.

Upon determining in step S601 that the representative color of interest has no special color setting, the application software 101 determines in step S604 whether the color of interest has a special color setting. Upon determining in step S604 that the color of interest has a special color setting, the application software 101 terminates the processing. Upon determining in step S604 that the color of interest has no special color setting, the application software 101 performs the processing in steps S406 to S408. This processing is the same as described with reference to FIG. 4.

The application software 101 groups the colors in this manner and displays the representative color of each group in a current color selection region 205 as in the first embodiment. In this case, the special color may be displayed together with the type of special color. This display may be "metallic color", "transparent toner", or the like in a text form or a symbol or the like indicating the type of color. The procedure for color editing may be the same as described with reference to FIG. 9. Note, however, that the special color is not displayed on the display. When the special color is displayed on the display, for example, a graphic pattern corresponding to the special color may be superimposed on the corresponding object.

According to the above embodiment, even when a vector image includes a special color setting, the graphics design application can display a UI that is easy to understand when simply editing the colors of objects included in a vector image. In addition, this can prevent a special color and a not special color from being classified to the same group and prevent them from being displayed as members of the same group. This makes it possible to prevent colors discriminated according to whether each color is a special color from being replaced altogether even upon replacing a representative color with another color.

Modification

According to the first and second embodiments, the colors of objects of a vector image are extracted, and the information processing apparatus groups the extracted colors. In contrast to this, the extracted colors may be directly displayed in a current color selection region 205 on a temporary basis, and the user may select colors to be grouped for each group. For example, upon designating group 1, the user may select colors belonging to group 1 and a representative color from the colors displayed in the current color selection region 205. This processing may be performed for another group in the same manner to group the colors. In this case, colors with similar hue may be arranged close to each other in the current color selection region 205. If there is any color that is not selected as a color to be grouped, the color may be grouped as a color group including only the color as a representative color. After the grouping is completed, the representative color of each group may be re-displayed in the current color selection region 205.

Each embodiment described above has exemplified the conversion of colors as color editing. However, color editing is not limited to color conversion, and the technique of displaying similar colors in a representative color may be applied to other color editing operations.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-127732, filed Aug. 3, 2021 which is hereby incorporated by reference herein in its entirety.

What is claimed is:

1. An information processing apparatus comprising:
   at least one memory configured to store at least one program; and
   at least one processor, the at least one program causing the at least one processor to perform:
   extracting a plurality of colors used for an image,
   linking each of the plurality of extracted colors to one of a plurality of color groups including a first color group associated with a first representative color and a second color group associated with a second representative color,
   displaying, in a first region of a user interface, a representative color associated with a group, of the plurality of color groups, to which at least one of the plurality of extracted colors is linked,
   displaying a color palette including at least one color in a second region of the user interface, and
   replacing a color included in the image and belonging to the color group associated with the selected representative color with a color selected from the color palette,
   wherein if the plurality of color groups include a plurality of groups to which at least one of the plurality of extracted colors is linked, a plurality of representative colors respectively associated with the plurality of groups to which at least one of the plurality of extracted colors is linked are displayed in the first region,
   wherein colors used for the image include a spot color that cannot be expressed by a color component of ink for process color printing, the spot color including spot color information indicating the spot color in addition to a value of the color component, and
   wherein in the linking, in a case where the representative color is the spot color, colors of which a color component of the representative color and the spot color information matches are linked to a color group of the representative color, and
   wherein colors of which a color component of the representative color and the spot color information do not match are not linked to the color group of the representative color even if the representative color is the spot color.

2. The apparatus according to claim 1, wherein the linking includes, if a distance between the representative color and the extracted color is not more than a predetermined threshold, linking the extracted color as a color belonging to a group of the representative color.

3. The apparatus according to claim 2, wherein the extracting includes creating a color list of colors used for the image, and
   the linking includes selecting the representative color from the color list and linking a color, of colors included in the color list and not linked, whose distance from the representative color is not more than a predetermined threshold as a color belonging to a group of the representative color.

4. The apparatus according to claim 1, wherein the linking includes, if the representative color is not the spot color, linking colors matching in color component of the representative color to the color group of the representative color.

5. The apparatus according to claim 1, wherein the spot color includes at least one of a transparent color, a fluorescent color, and a metallic color.

6. The apparatus according to claim 1, wherein the image is re-displayed with a color replaced by the replacing.

7. The apparatus according to claim 1, wherein the at least one program further causes the at least one processor to select the image.

8. The apparatus according to claim 1, wherein the at least one program is an application program different from a printer driver configured to create print data.

9. The apparatus according to claim 1, wherein the at least one program further causes the at least one processor to execute print output processing for printing the image.

10. A non-transitory computer-readable storage medium storing a computer program which, when loaded into a computer and executed, causes the computer to perform an information processing method, the method comprising:
    extracting a plurality of colors used for an image,
    linking each of the plurality of extracted colors to one of a plurality of color groups including a first color group associated with a first representative color and a second color group associated with a second representative color,
    displaying, in a first region of a user interface, a representative color associated with a group, of the plurality of color groups, to which at least one of the plurality of extracted colors is linked,
    displaying a color palette including at least one color in a second region of the user interface, and
    replacing a color included in the image and belonging to the color group associated with the selected representative color with a color selected from the color palette,
    wherein if the plurality of color groups include a plurality of groups to which at least one of the plurality of extracted colors is linked, a plurality of representative colors respectively associated with the plurality of groups to which at least one of the plurality of extracted colors is linked are displayed in the first region,
    wherein colors used for the image include a spot color that cannot be expressed by a color component of ink for process color printing, the spot color including spot color information indicating the spot color in addition to a value of the color component, and
    wherein in the linking, in a case where the representative color is the spot color, colors of which a color component of the representative color and the spot color information matches are linked to a color group of the representative color, and
    wherein colors of which a color component of the representative color and the spot color information do not match are not linked to the color group of the representative color even if the representative color is the spot color.

11. An information processing method comprising:

extracting a plurality of colors used for an image, linking each of the plurality of extracted colors to one of a plurality of color groups including a first color group associated with a first representative color and a second color group associated with a second representative color, displaying, in a first region of a user interface, a representative color associated with a group, of the plurality of color groups, to which at least one of the plurality of extracted colors is linked, displaying a color palette including at least one color in a second region of the user interface, and replacing a color included in the image and belonging to the color group associated with the selected representative color with a color selected from the color palette, wherein if the plurality of color groups include a plurality of groups to which at least one of the plurality of extracted colors is linked, a plurality of representative colors respectively associated with the plurality of groups to which at least one of the plurality of extracted colors is linked are displayed in the first region, wherein colors used for the image include a spot color that cannot be expressed by a color component of ink for process color printing, the spot color including spot color information indicating the spot color in addition to a value of the color component, and wherein in the linking, in a case where the representative color is the spot color, colors of which a color component of the representative color and the spot color information matches are linked to a color group of the representative color, and wherein colors of which a color component of the representative color and the spot color information do not match are not linked to the color group of the representative color even if the representative color is the spot color.

12. The method according to claim 11, wherein the linking includes, if a distance between the representative color and the extracted color is not more than a predetermined threshold, linking the extracted color as a color belonging to a group of the representative color.

13. The method according to claim 12, wherein the extracting includes creating a color list of colors used for the image, and the linking includes selecting the representative color from the color list and linking a color, of colors included in the color list and not linked, whose distance from the representative color is not more than a predetermined threshold as a color belonging to a group of the representative color.

14. The method according to claim 11, wherein the linking includes, if the representative color is not the spot color, linking colors matching in color component of the representative color to the color group of the representative color.

15. The method according to claim 11, wherein the spot color includes at least one of a transparent color, a fluorescent color, and a metallic color.

16. The method according to claim 11, wherein the image is re-displayed with a color replaced by the replacing.

17. The method according to claim 11, further comprising selecting the image.

18. The method according to claim 11, wherein the information processing method is executed by an application program different from a printer driver configured to create print data.

19. The method according to claim 11, further comprising executing print output processing for printing the image.

* * * * *